L. M. HAWKINS.
GUARD MEANS FOR THE CUTTING MECHANISM OF BINDERS, MOWERS, &c.
APPLICATION FILED OCT. 22, 1914.
1,165,169.
Patented Dec. 21, 1915.
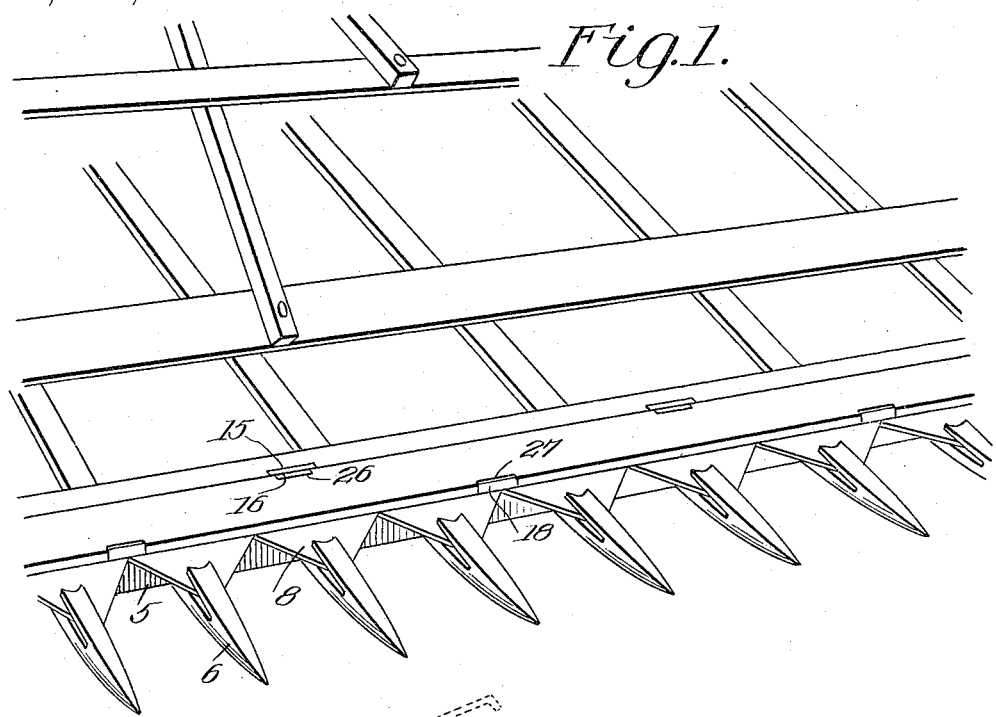
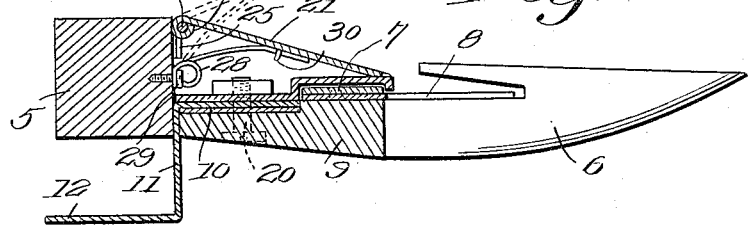
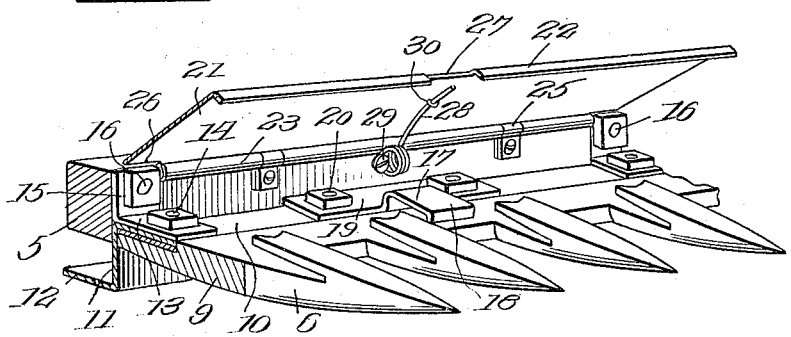
WITNESSES
J. E. Dad.
Alan F. Garner.
INVENTOR
Lewis M. Hawkins
BY Munn & Co.
ATTORNEYS

UNITED STATES PATENT OFFICE.

LEWIS M. HAWKINS, OF CARROLLTON, MISSOURI.

GUARD MEANS FOR THE CUTTING MECHANISM OF BINDERS, MOWERS, &c.

1,165,169.  Specification of Letters Patent.  Patented Dec. 21, 1915.

Application filed October 22, 1914. Serial No. 868,058.

*To all whom it may concern:*

Be it known that I, LEWIS M. HAWKINS, a citizen of the United States, residing at Carrollton, in the county of Carroll and State of Missouri, have invented certain new and useful Improvements in Guard Means for the Cutting Mechanism of Binders, Mowers, &c., of which the following is a specification.

This invention relates to a cutting mechanism for binders, harvesters, mowing machines, etc., and more particularly to improved means for preventing the clogging of the sickle blades and guard fingers and for preventing the sickle bar from tripping or jerking short grain down lengthwise, resulting in the elevation of the end of the cutting mechanism, thus causing the binder string to miss tying some of the grain, which would result in an unnecessary waste of grain.

One of the principal objects of the invention is to provide a cutting mechanism with a hingedly supported guard plate overhanging the sickle bar and operating to prevent clogging of the bar and adjacent parts with the grass or grain as the same is being cut, said guard plate being so mounted as to be capable of being lifted to allow access to the parts normally covered thereby.

A further object of the invention is to provide a device of the class described which will be simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a view in perspective of a portion of the cutting mechanism of a binder. Fig. 2 represents a view in cross section of the same, the position of the guard plate when raised being indicated in dotted lines, and Fig. 3 represents a view in perspective, parts being shown in section, of a fragment of the cutting mechanism, the guard plate being shown in raised position.

In carrying out my invention I employ a cutting mechanism including a finger bar 5 and guard fingers 6. The latter are of usual construction and support the reciprocatory sickle in the usual manner. The sickle includes a sickle bar 7 to the under side of which the sickle knives or sections 8 are secured. The guard fingers project forwardly from a body portion 9 with which they are integrally formed. The upper face of this body portion is rabbetted near its rear edge, and in the rabbet is disposed the forward doubled edge 10 of a plate whose central portion 11 is disposed at right angles to portion 10 and occurs between body 9 of the guard fingers and the finger bar 5. The lower portion 12 of the plate is bent at right angles to body 11 thereof, and depends below the finger bar in a horizontal plane. The lower legs 13 of right angle irons are disposed upon the doubled edge 10 of plate 11, and said body 9, doubled edge 10 and legs 13 are connected together and secured in place by means of the bolts 14. The opposite legs 15 of the angle irons are secured by bolts or other suitable fastening means 16 to the front face of finger bar 5. In this manner the guard fingers are detachably secured to the finger bar.

The sickle bar 7 is guided and maintained in place by means of cleats 17 which occur at spaced intervals along the cutting mechanism. These cleats include hooked portions 18 overhanging the sickle bar. The hooks project forwardly from the plates 19, which are detachably secured in place by the fastening means 20 which also serve to aid fastenings 14 in connecting the guard fingers to the doubled edge of plate 11. As indicated more clearly in Fig. 3 the guard fingers and sickle are arranged in a plane somewhat below the upper surface of finger bar 5.

In order to prevent grain or grass from clogging the sickle and rear portions of the guard fingers, during the operation of the mechanism, I provide a guard plate 21. The latter is in the form of a flat strip having a depending lip 22 formed along its forward edge and having its rear edge beaded or turned as at 23 for the reception of a pintle pin 24. The pin is composed of sections, each of which extends between adjacent fastenings 15 as indicated in Fig. 3, and each section is secured to the finger bar 5 by a plurality of clips 25 fastened to the front face of said finger bar. The pintle pins are so disposed that the upper surface of the guard plate at its rear edge or along the beaded portion thereof is flush with the upper surface of finger bar 5. Along its rear edge the guard is recessed at intervals as at 26 to accommodate the fastenings 16 in such manner as to allow pivotal movement of the guard plate upon the pintle pins. The lipped edge 22 is also recessed at intervals as at 27 to accommodate the hooked portions 18 of cleats 17. The cleats serve normally to support the guard plates in the position indicated in Fig. 2. When in this position the plate effectually prevents entrance of grain or grass to the sickle bar and adjacent parts of the mechanism. Although the lipped portion 22 is disposed in close proximity to the sickle bar and knives, yet it is not in contact with them, so that no frictional retardation is caused by the use of the guard plate.

In order to normally maintain the guard plate in the position indicated in Fig. 3, resilient means in the form of a plurality of springs indicated at 28 is employed. Each spring is secured at its rear end by means of a screw or similar fastening 29 to the front face of finger bar 5 below the pintle pin 24. Each spring is coiled intermediate its ends, and the forward end of the spring slidably extends through a small staple or similar keeper 30 depending from the under face of the guard plate. The tendency of the springs is to maintain the plate in lowered position.

The guard plate 21 may be lifted if desired to a position approximately indicated in dotted lines, so that access to the portions normally covered by the guard plate may be had.

Although I have described the preferred embodiment of my invention, I may desire to make such changes in the construction, combination and arrangement of parts thereof as do not depart from the spirit of the invention and the scope of the appended claims.

I claim:—

1. In a cutting apparatus, the combination with a finger bar having guard fingers, a sickle and cleats operably associated therewith, said guard fingers, sickle and cleats being disposed below the plane of the upper face of said finger bar, of a guard plate having its forward edge provided with a depending lip and having its rear edge rolled, a pintle pin supported relatively to the finger bar and extending through the rolled portion of the edge of the guard plate for pivotally connecting the latter relatively to the finger bar, said guard plate having its lipped edge provided with recesses for accommodating said cleats, the latter adapted to support the guard plate in close proximity to but out of engagement with the sickle, and resilient means for normally maintaining the guard plate in lowered position.

2. A device of the class described including a finger bar, having a plurality of guard fingers extending therefrom, a sickle operatively disposed relatively to the guard fingers, a plurality of cleats for guiding the sickle, and a guard plate pivotally connected along one edge to the finger bar near the upper surface of the latter, said guard plate extending outwardly and overhanging the rear portions of the guard fingers and sickle and being supported out of contact with said sickle by the cleats.

3. A device of the class described comprising a finger bar, guard fingers and a sickle operably associated therewith and disposed below the plane of the upper surface of said finger bar, a plurality of cleats for guiding the sickle, a normally inclined guide plate pivotally connected along its rear edge to the finger bar near the upper surface of the latter, said plate extending forwardly and overhanging the rear portions of the finger guards and sickle, and spring means connected to the finger bar and engaging with the guard plate for normally maintaining the latter at its free edge in engagement with the cleats.

4. In a cutting mechanism, the combination with a finger bar, guard fingers, and a sickle, of a plate pivotally connected at one edge adjacent the finger bar and at its opposite edge overhanging the rear portion of the guard fingers and sickle in close proximity thereto and forming a continuous guard for the sickle, a plurality of springs arranged beneath the plate and being connected thereto and to the finger bar for normally maintaining the guard plate in such position at its free edge as to be disposed in close proximity to the rear portions of the guard fingers and sickle, means for maintaining the free edge of the plate out of contact with the sickle, said plate adapted to be raised for allowing access to the parts housed thereby.

5. The combination with a finger bar, guard fingers and sickle of a cutting mechanism, of a guard plate pivotally connected to the finger bar at one edge, and at its other edge overhanging and housing the rear portions of the finger bars and sickle, and cleats adapted to guide the sickle and support the guard plate.

6. In a cutting mechanism, the combination with a finger bar, guard fingers and a sickle, of a continuous guard plate pivotally connected at one edge to the finger bar and at its other edge disposed adjacent the sickle and operating to house the rear portions of the guard fingers and sickle, guide means for the sickle adapted to support the guard plate adjacent its other edge out of contact with the sickle, and spring means arranged below the guard plate and connected with it in such manner as to maintain said guard plate normally in contact with its supporting means.

LEWIS M. HAWKINS.

Witnesses:
HARPER HAWKINS,
CARTER L. HAWKINS.

Copies of this patent may be obtained for five cents each, by addressing the "Commissioner of Patents, Washington, D. C."